April 18, 1944.     E. H. LAND     2,346,766
LIGHT POLARIZER
Filed Sept. 25, 1941
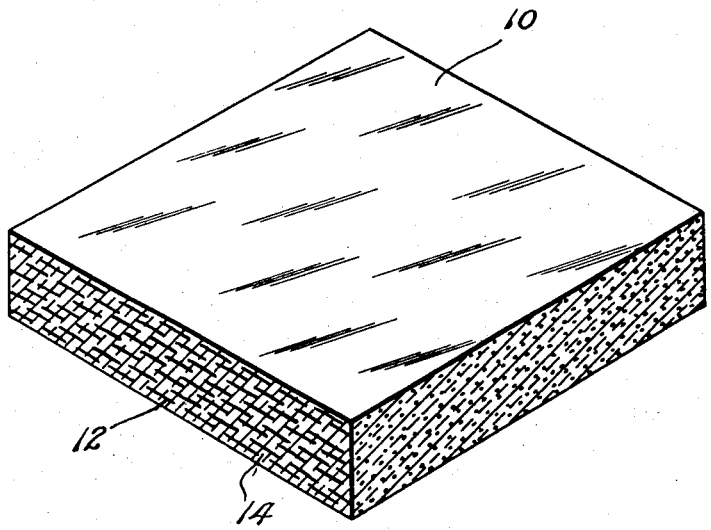
Edwin H. Land
Inventor:
by Donald L. Brown
Attorney Patented Apr. 18, 1944

2,346,766

UNITED STATES PATENT OFFICE 2,346,766

LIGHT POLARIZER

Edwin H. Land, Cambridge, Mass., assignor to Polaroid Corporation, Dover, Del., a corporation of Delaware Application September 25, 1941, Serial No. 412,281

17 Claims. (Cl. 88—65)

This invention relates to light polarizers.

It is an object of the invention to provide a new light-polarizing device in sheet form comprising a suspension in a transparent plastic medium of molecularly oriented fibers dyed with one or more dichroic dyes and with said fibers oriented in substantially parallel relation within said sheet.

A further object of the invention is to provide such a polarizer wherein the polarizing properties derive essentially from a multiplicity of filaments of dyed ramie or other molecularly oriented material oriented in substantially parallel relation within said sheet.

Other objects and advantages will in part be apparent and in part be pointed out in the course of the following descriptions of one or more embodiments of the invention, which are given as non-limiting examples.

For a fuller understanding of the invention, reference should be had to the accompanying drawing, which represents diagrammatically and in greatly enlarged scale a perspective view, partly in section, of a portion of a sheet of light-polarizing material embodying a preferred form of the invention.

Certain molecularly oriented fibers or filaments have the property of absorbing dichroic stains or dyes and of exhibiting dichroism. The term "dichroism" is used herein as meaning the property of differential absorption of the components of an incident beam of light, depending upon the vibration directions of said components. By "dichroic" dye or stain as used herein is meant a dye or stain whose molecules possess the property of showing dichroism. Thus, for example, if a fiber of molecularly oriented material such as ramie is dyed with a dichroic dye such as Congo red, it will appear dichroic, i. e., it will absorb differently the components of an incident beam of light vibrating in directions parellel and perpendicular to the direction of molecular orientation within the fiber. With some of the dyes and stains which may be used for the purposes of the present invention, the dichroism of the dyed fiber may extend throughout substantially the entire visible spectrum, whereas other dyes possess considerably shorter absorption bands and hence show dichroism only throughout a band of wavelengths shorter than the visible spectrum.

In accordance with the present invention, the polarizing body is produced by forming a suspension in a transparent plastic medium, which is preferably not hydrophilic, of a multiplicity of dichroic fibers or filaments which are preferably hydrophilic and which are oriented in substantially parallel relation. The fibers and filaments preferably employed may comprise fibers which are naturally molecularly oriented, such as ramie fibers, and filaments or fibers of suitable plastic materials which have been subjected to stretching operation to orient the molecules therein. Examples of materials of the latter class include hydrophilic materials such as polyvinyl alcohol, rayon, and the polyamides. Preferred results are obtained by using as the suspending medium a transparent plastic having an index of refraction matching as closely as possible that of the individual fibers used and more particularly matching the index of the fibers for the transmitted component of the incident light, and examples of suitable materials include transparent non-hydrophilic plastics, cellulosic materials such as cellulose acetate and cellulose nitrate, vinyl resins such as vinyl acetate, polyvinylidene chloride, and similar materials.

According to the practice of the invention, fibers of the selected material are first dyed with the desired dichroic dye or dyes, and are then embedded in a transparent plastic suspending medium preferably having the same index of refraction. The mass is then formed into a sheet or film of the desired thickness, while at the same time or subsequently it is subjected to a force capable of orienting the dyed fibers into substantially parallel relation within the sheet. For example, this may be done either by stretching the sheet after it is formed or by extruding the plastic mass in sheet form, the force of extrusion being sufficient to orient the fibers. In the diagrammatic view of an embodiment of the invention shown in the drawing, element 10 represents a sheet of polarizing material formed in accordance with the invention and comprising a multiplicity of dichroically dyed fibers or filaments 12 in transparent suspending medium 14, which preferably has an index of refraction matching as closely as possible that of fibers 12.

The lengths of the individual fibers may vary considerably. The fibers should be sufficiently short to be orientable with a minimum of effort. For preferred results, particularly if the orientation of the fibers is to be accomplished by extrusion, a length in the order of one-sixteenth of an inch to one-eighth of an inch has been found satisfactory.

It has been found desirable, where long fibers or filaments are available for the manufacture of the product of the present invention, to first dye the fibers or filaments with the dichroic dye or dyes selected and then cut the filaments or fibers into the desired length before incorporating them in the suspending plastic medium. Where filaments formed from organic plastics such as polyvinyl alcohol are used in the practice of the invention, the material comprising the filaments may be dyed with the dichroic dye or dyes employed either prior to or subsequent to the formation of the filaments and either prior to or subsequent to the elongation or stretch of the filaments to orient their molecules.

Considerable latitude may be exercised in the choice of dyes or stains which are suitable for the practice of the invention. Preferably the dyes employed should be selected with a view to their affinity for the plastic filament or natural fiber with which they are to be incorporated and they should preferably show a normally high density ratio for the absorbed and unabsorbed components of incident light. Speaking generally, satisfactory dyes for use in the practice of the present invention are to be found in the group of direct cotton dyes and, with few exceptions, in the disazo, stilbene, trisazo, monoazo, thiazole and pyrazalone groups.

Where a neutral light polarizer is desired, the fibers or filaments employed may be stained with iodine or with a solution of iodine and a soluble iodide. So also, such a neutral polarizer, i. e., one that appears a neutral gray in color and which shows substantial dichroism throughout the visible spectrum, may be obtained by employing a plurality of dichroic direct cotton dyes and more specifically a combination of two or more complementary dyes. Where three dyes are employed, such a neutral polarizer may be obtained by employing a minus red dye forming a cyan component, for example such a dye as Niagara Sky Blue 6B, Niagara Blue NR, Niagara Sky Blue or Niagara Blue 2B, a minus green dye forming a magenta component, for example such a dye as Solantine Pink 4BL, Solantine Red 8BL, Geranine GL, Pontamine Fast Pink GGN, or Erie Garnet RB, and a minus blue dye forming a yellow component, for example such a dye as Solantine Yellow FF, Stilbene Yellow 3GA, or Erie Yellow Y. It will, of course, be understood that the specific dyes mentioned are typical of a great number which may be used and the mention of these dyes is not to be deemed to exclude others from the scope of the invention.

In the practice of the present invention and in the production of such a neutral polarizer as has been described, all of the fibers employed may be dyed with all of the dyes or some of the fibers may be dyed with one dye, some with another and some with still a third, and mixtures of the variously dyed fibers may be incorporated in the suspending plastic carrier. It will, of course, be apparent that dichroic polarizers which are not neutral but which exhibit dichroism within a narrow band in the visible spectrum may be produced by employing fibers dyed with one or a plurality of dichroic dyes which exhibit dichroism throughout a restricted wavelength band or bands.

So also, where a neutral polarizer comprising two dichroic dyes is desired, satisfactory results may be obtained by combining a minus red dye such as Niagara Sky Blue 6B with a brown or orange dye such for example as Solantine Brown R or Erie Fast Brown 3RB or Pontamine Diazo Orange (J-acid derivative). So also, Erie Garnet RB and Erie Green MT will together produce a neutral light polarizer. It is sometimes desirable to incorporate with such dichroic dyes a dichroic black dye, for example Erie Black GXOO.

It is to be understood, furthermore, that in many cases the fibers or filaments employed may be dyed or stained with metals or metallic salts which show dichroism. All such products are to be deemed to fall within the scope of the present invention.

Furthermore, while the present invention has been described as comprising relatively short fibers or filaments which have been rendered dichroic and which are suspended in oriented relation in a transparent plastic carrier and preferably in such a carrier having an index of refraction coinciding with that of the fibers or filaments suspended therein, it is to be understood that long and relatively thick fibers or filaments, and particularly such filaments of synthetic oriented plastic material as polyvinyl alcohol, may be employed in the manufacture of other products falling within the scope of the present invention. One such product, for example, is a fabric comprised of warp and woof threads, one group of threads for example the warp threads being dichroic light-polarizing filaments of the character described.

It will, of course, be apparent that light-polarizing sheets embodying the product of the present invention may be laminated between or to supporting sheets or films such for example as sheets of glass or sheets of other organic plastic materials and that light polarizers of the present invention either in laminated or unlaminated form may be employed wherever other forms of light-polarizing plastic materials have heretofore been used, for example in connection with headlight glare elimination systems, in connection with sunglasses, stereoscopic viewing devices, advertising displays and in other diverse commercial applications.

In the practice of the present invention a preferred product is one in which the individual dichroic fibers or filaments employed show a high dichroic ratio but relatively weak dichroism. The polarizing sheet as a whole comprising a multiplicity of superimposed suspended filaments or fibers of the character described will preferably show a high dichroic ratio and high dichroism. In other words, it is intended that the individual fibers or filaments need not be complete polarizers. They may transmit a considerable portion of the undesired component, for example, provided they transmit preferably substantially all of the desired component. It is intended that substantially complete absorption of the undesired component will be accomplished only after the transmitted beam has traversed several of the suspended fibers or filaments. It has been found that a polarizing sheet possessing these properties is preferred. It is, however, to be understood that the invention is to be deemed of such scope as to include products in which the individual suspended fibers or filaments show high dichroism.

Furthermore, while the product of the present invention has been described as one in which the suspended fibers or filaments have been dyed for example with a water-soluble direct dye or with some other dichroic dye, it is to be understood that the invention is to be deemed to cover the use of filaments, for example filaments of a light-transmitting plastic in which minute optically oriented polarizing particles have been suspended. These particles may take the form of minute needle-shaped polarizing crystals such for example as crsytals of herapathite. Under these circumstances the product of the present invention would comprise a transparent matrix for example of a plastic material in which a multiplicity of plastic filaments is embedded, these filaments being oriented to substantial parallelism and each filament containing a plurality of optically oriented dichroic polarizing crystals. All such modifications of the invention are to be deemed to fall within its scope.

Since certain changes may be made in the above product and different embodiments of the invention could be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A light-polarizing device comprising, in combination, a sheet of a transparent plastic material having suspended therein a multiplicity of fibers having dichroic material incorporated therewith, said fibers being oriented in substantially parallel relation.

2. A light-polarizing device comprising, in combination, a sheet of a transparent plastic material having suspended therein a multiplicity of molecularly oriented fibers having a dichroic dye incorporated therewith, said fibers being oriented in substantially parallel relation within said sheet.

3. A light-polarizing device comprising, in combination, a sheet of a transparent plastic material having suspended therein a multiplicity of molecularly oriented fibers having a dichroic dye incorporated therewith, said fibers being oriented in substantially parallel relation within said sheet, the index of refraction of said plastic material being substantially the same as that of said fibers.

4. A light-polarizing device comprising, in combination, a sheet of a transparent plastic material having suspended therein a multiplicity of molecularly oriented fibers having a dichroic dye incorporated therewith, said fibers being oriented in substantially parallel relation within said sheet and being so arranged and present in such quantity that light incident substantially normally on the surface of said sheet will be substantially polarized in traversing the same, the index of refraction of said plastic material being substantially the same as that of said fibers.

5. A light-polarizing device comprising, in combination, a sheet of a transparent plastic material having suspended therein a multiplicity of ramie fibers having a dichroic dye incorporated therewith, said fibers being oriented in substantially parallel relation within said sheet.

6. A light-polarizing device comprising, in combination, a sheet of a transparent plastic material having suspended therein a multiplicity of molecularly oriented filaments of a transparent organic plastic material having a dichroic dye incorporated therewith, said filaments being oriented in substantially parallel relation within said sheet.

7. A light-polarizing device comprising, in combination, a sheet of a transparent plastic material having suspended therein a multiplicity of molecularly oriented filaments of a transparent organic plastic material having a dichroic dye incorporated therewith, said filaments being oriented in substantially parallel relation within said sheet, the index of refraction of said plastic material being substantially the same as that of said filaments.

8. A light polarizer comprising a multiplicity of relatively long, molecularly oriented, transparent, filaments, each said filament having a dichroic dye incorporated therewith, and means for holding said filaments in substantially permanent parallel relation with each other whereby light transmitted by said polarizer is plane-polarized to vibrate in a predetermined direction.

9. A light polarizer comprising a multiplicity of molecularly oriented dichroic filaments of an organic plastic, the dichroism of said filament deriving from dichroic material incorporated therewith, and means for holding said filaments in substantially permanent parallel relation with each other.

10. A substantially neutral light-polarizing sheet having a high dichroic ratio throughout substantially the entire visible spectrum and comprising a transparent suspending medium having dispersed therethrough a multiplicity of substantially parallel, molecularly oriented fibers, each fiber having incorporated therewith at least one dichroic dye.

11. A substantially neutral light-polarizing sheet having a high dichroic ratio throughout substantially the entire visible spectrum and comprising a transparent suspending medium having dispersed therethrough a multiplicity of substantially parallel, molecularly oriented fibers, each fiber having incorporated therewith at least one dichroic dye, certain of said fibers having incorporated therewith a minus red dichroic dye, others of said fibers having incorporated therewith a minus blue dichroic dye, and still others of said fibers having incorporated therewith a minus green dichroic dye.

12. A substantially neutral light-polarizing sheet having a high dichroic ratio throughout substantially the entire visible spectrum and comprising a transparent suspending medium having dispersed therethrough a multiplicity of substantially parallel, molecularly oriented fibers, each fiber having incorporated therewith a plurality of dichroic dyes.

13. A substantially neutral light-polarizing sheet having a high dichroic ratio throughout substantially the entire visible spectrum and comprising a transparent suspending medium having dispersed therethrough a multiplicity of substantially parallel, molecularly oriented fibers, each fiber having incorporated therewith at least one dichroic dye, the index of refraction of the suspending medium matching substantially the index of refraction of said fibers.

14. A light-polarizing device comprising, in combination, a sheet of a transparent plastic material having suspended therein a multiplicity of fibers having dichroic material incorporated therewith, said fibers being oriented in substantially parallel relation, the dichroic fibers being hydrophilic and the sheet plastic material being non-hydrophilic.

15. A light-polarizing device comprising, in combination, a sheet of a transparent plastic material having suspended therein a multiplicity of fibers having dichroic material incorporated therewith, said fibers being oriented in substantially parallel relation, the dichroic fibers showing individually relatively weak dichroism and a high dichroic ratio, the polarizing sheet showing a high dichroic ratio and relatively high dichroism.

16. A light-polarizing device comprising, in combination, a sheet of a transparent plastic material having suspended therein a multiplicity of molecularly oriented filaments of a transparent organic plastic material containing oriented dichroic particles, said filaments being oriented in substantially parallel relation within said sheet.

17. A light-polarizing device comprising, in combination, a sheet of a transparent plastic material having suspended therein a multiplicity of molecularly oriented fibers having a dichroic dye incorporated therewith, said fibers being oriented in substantially parallel relation within said sheet, the index of refraction of said plastic material being substantially the same as that of said fibers for the transmitted ray.

EDWIN H. LAND.